(12) United States Patent
Yokosawa (10) Patent No.: US 7,791,805 B2
(45) Date of Patent: Sep. 7, 2010

(54) MULTIFOCAL LENS ARRAY AND THREE-DIMENSIONAL STEREOSCOPIC IMAGE DISPLAY APPARATUS

(75) Inventor: Teruhisa Yokosawa, Nagano (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 320 days.

(21) Appl. No.: 11/673,176

(22) Filed: Feb. 9, 2007

(65) Prior Publication Data

US 2007/0188862 A1   Aug. 16, 2007

(30) Foreign Application Priority Data

Feb. 9, 2006   (JP)   ............... 2006-033020

(51) Int. Cl.
G02B 27/10   (2006.01)
G03B 21/60   (2006.01)

(52) U.S. Cl. ...................... 359/626; 359/457
(58) Field of Classification Search ......... 359/454–457, 359/463, 618–626
See application file for complete search history.

(56) References Cited

U.S. PATENT DOCUMENTS

| | | | |
|---|---|---|---|
| 5,883,739 A * | 3/1999 | Ashihara et al. | ............ 359/462 |
| 6,525,699 B1 | 2/2003 | Suyama et al. | |
| 6,940,473 B2 | 9/2005 | Suyama et al. | |
| 6,950,078 B2 | 9/2005 | Suyama et al. | |
| 7,002,532 B2 | 2/2006 | Suyama et al. | |
| 2008/0158671 A1 * | 7/2008 | Lee | ............................ 359/462 |

FOREIGN PATENT DOCUMENTS

| | | |
|---|---|---|
| JP | 48-40451 | 6/1973 |
| JP | 60-009290 | 1/1985 |
| JP | 04-034543 | 2/1992 |
| JP | 2000-115812 | 4/2000 |
| JP | 2000-338900 | 12/2000 |
| JP | 2004-151645 | 5/2004 |
| JP | 2005-360976 | 12/2005 |

* cited by examiner

*Primary Examiner*—Scott J Sugarman
*Assistant Examiner*—Dawayne A Pinkney
(74) *Attorney, Agent, or Firm*—Rabin & Berdo, P.C.

(57) ABSTRACT

A multifocal lens array and a three-dimensional stereoscopic image display apparatus, which has a low cost, simple structure. A two-dimensional image is displayed on a display apparatus and is incident on a multifocal lens array. The array includes a plurality of lenses arranged on a planar surface, respective focal distances of the lenses being selected so that a focal point-containing surface is formed at a surface inclined relative to the planar surface. A stereoscopic diffusing panel including six transparent panels is disposed at the focal point-containing surface, and is moved periodically in a depth direction, so that sectional images of a three-dimensional stereoscopic image are rendered on the stereoscopic diffusing panel through image light from the apparatus, and hence a person viewing light reflected from the stereoscopic diffusing panel can see the three-dimensional stereoscopic image due to an after-image effect.

17 Claims, 11 Drawing Sheets

MULTIFOCAL LENS ARRAY AND THREE-DIMENSIONAL STEREOSCOPIC IMAGE DISPLAY APPARATUS

BACKGROUND OF THE INVENTION

1. Field of the Invention

The present invention relates to a multifocal lens array and to a three-dimensional stereoscopic image display apparatus that displays a three-dimensional stereoscopic image in three-dimensional space.

2. Description of the Related Art

It is anticipated that display of stereoscopic images will be widely used in fields such as the following so long as the display performance and cost are appropriate. In the medical field, by displaying stereoscopic data from a CT scan or the like in space, a diseased site can be identified before surgery, which is very useful. In construction, by viewing CAD data stereoscopically, spatial checking of areas can be carried out, which again is useful. In facility design, robot design and so on, the spatial arrangement of components can actually be seen, and hence design can be carried out with no waste. Moreover, in town planning and regional development, by carrying out studies using a three-dimensional stereoscopic image, more realistic studies can be carried out. In air traffic control, the positions and altitudes of airplanes can be checked instantly, and hence dangerous situations such as near misses can be reduced. In defense, three-dimensional terrain information and spatial information can be grasped instantly, and hence there would be many opportunities for use. In entertainment, i.e., in fields such as gaming in which enjoyment is had while manipulating images, one can anticipate novel types of entertainment in which a plurality of people simultaneously view or manipulate a stereoscopic image from a variety of angles.

For displaying a three-dimensional stereoscopic image in three-dimensional space, there exists a method in which the difference in viewing angle between the left and right eyes is used so as to enable a person to see stereoscopically, and a method in which display is actually carried out in three-dimensional space so as to enable viewing from all directions over 360°. As a method in which display is actually carried out in three-dimensional space, there is, for example, a method in which a stereoscopic image is actually displayed in space using lasers as in, for example, Japanese Patent Application Laid-open No. 2000-338900.

However, for methods in which the difference in viewing angle between the left and right eyes is used, as in, for example, Japanese Patent Application Laid-open No. 2000-115812, U.S. Pat. Nos. 6,525,699, 6,940,473, 6,950,078, and 7,002,532, there exists the problem that, while a stereoscopic image can be seen when viewed from a certain direction, when viewed from another place either viewing is not possible or a stereoscopic image cannot seen. Moreover, in the case of using lasers or the like, there is a problem that the apparatus is large and hence there are limitations on the installation site due to restrictions relating to size, weight and so on, and, moreover, the cost is high.

SUMMARY OF THE INVENTION

It is thus an object of the present invention to provide a multifocal lens array and a three-dimensional stereoscopic image display apparatus according to which the above problems are resolved.

The present invention provides a multifocal lens array comprising a plurality of lenses arranged on a planar surface, wherein respective focal distances of the plurality of lenses are selected so that a focal point-containing surface is formed at a surface inclined relative to the planar surface.

Moreover, the present invention provides a three-dimensional stereoscopic image display apparatus comprising a display apparatus which displays a two-dimensional image, a multifocal lens array as described above disposed in a position at which light is incident from a display screen of the display apparatus, a transparent or semi-transparent reflecting object having a surface which is positioned at the focal point-containing surface and which reflects light from the display screen of the display apparatus which has been formed into an image via the multifocal lens array, driving means for driving the reflecting object and the multifocal lens array such that the reflecting object and the multifocal lens array move periodically while maintaining a spacing between the display screen of the display apparatus and the multifocal lens array, and image data producing means for producing data for two-dimensional images displayed by the display apparatus such that a sectional image of a three-dimensional stereoscopic image is rendered on the surface of the reflecting object by light from the two-dimensional image displayed on the display screen of the display apparatus, and in synchronization with the movement of the reflecting object and the multifocal lens array, sectional images of the three-dimensional stereoscopic image at positions corresponding to the movement are rendered on the surface of the reflecting object.

According to the above constitution, light from the display screen of the display apparatus which displays a two-dimensional image is reflected by reflecting surfaces of the reflecting object in the optical path of the light, and the reflecting object is moved. The display apparatus successively displays separate images (sections of the stereoscopic image) in response to the movement. A viewing person remembers an after-image, and hence upon moving the reflecting object rapidly, it looks just as if the stereoscopic image is in space. Moreover, the apparatus can be realized with a simple structure and can be made small in size so that the installation site is not subject to many restrictions and the cost can be kept down.

Here, the thickness of each of the lenses may be made to be not more than 2 mm. As a result, there can be provided a lens array that has little air resistance and hence can be moved rapidly.

Furthermore, in the present invention, the reflecting object may have a plurality of reflecting surfaces. As a result, each reflecting surface need only display part of the stereoscopic image and hence the stereoscopic image can be achieved without one reflecting surface moving the whole display area, whereby the degree of freedom of design of the driving means and the reflecting object can be increased, deterioration of the driving member can be prevented effectively, and, furthermore, display of a fast-moving stereoscopic image becomes possible.

Furthermore, the frequency of the periodic movement may be made to be not less than 5 Hz. As a result, even in the case of a moving stereoscopic image, the stereoscopic image can be seen as moving due to an after-image effect.

Furthermore, the driving means may carry out the driving such that the reflecting object and the multifocal lens array undergo periodic parallel movement in the optical path of the light from the display screen of the display apparatus. Alternatively, the driving means may carry out the driving such that the reflecting object and the multifocal lens array rotate periodically in the optical path of the light from the display screen of the display apparatus.

Furthermore, the shape of the reflecting object may be made to include part of a curved surface represented by X=r× cos Θ, Y=r×sin Θ, Z=a×Θ in terms of polar coordinates, where X, Y and Z are three-dimensional rectangular coordinate system's coordinate axes, r is the radius, Θ is the angle, and a is a constant. As a result, when calculating sections to be displayed on the curved surface, the height direction (Z) is proportional to the angle (Θ), and hence the calculation of the sections upon rotation of the reflecting object can be performed by simple addition, and thus the calculation is fast, and circuitry and an algorithm are simple.

Furthermore, the reflecting object may have glass beads attached to the surface thereof. As a result, a three-dimensional stereoscopic image can be displayed with high brightness. Alternatively, the reflecting object may have fluorescent paint attached to the surface thereof. As a result, a three-dimensional stereoscopic image can be displayed with high brightness.

Furthermore, the display apparatus may be a flat display apparatus, such as a liquid crystal panel, an EL display, or a CRT display. As a result, a widely used two-dimensional display apparatus can be used. Alternatively, the display apparatus may be a projection-type display apparatus, such as a liquid crystal projector or a DLP projector. As a result, a high-brightness light source can be used, and hence a three-dimensional stereoscopic image can be displayed with high brightness.

Furthermore, the image data producing means may produce the two-dimensional image data in synchronization with a signal relating to the driving of the reflecting object from the driving means. As a result, blurring can be suppressed effectively, and hence a three-dimensional stereoscopic image can be displayed stably.

Furthermore, when a monochromatic two-dimensional image is displayed by the display apparatus, the reflecting object may have a plurality of reflecting surfaces and materials that convert and reflect different colors may be used respectively on the reflecting surfaces of the reflecting object whereby a color stereoscopic image is composed. As a result, the brightness and density of the monochromatic light from the display apparatus can be increased, and hence a three-dimensional stereoscopic image can be displayed with high brightness and high density.

Furthermore, a plurality of the three-dimensional stereoscopic image display apparatuses may be arranged side-by-side, whereby a three-dimensional stereoscopic image is displayed divided over the plurality of reflecting objects. As a result, a three-dimensional stereoscopic image can be displayed over a large space.

According to the present invention, a multifocal lens array and a three-dimensional stereoscopic image display apparatus are provided which can be realized with a simple structure, which can be made small in size, for which the installation site is not subject to many restrictions, and for which the cost can be kept down.

BRIEF DESCRIPTION OF THE DRAWINGS

FIG. 4B shows an image displayed on a two-dimensional flat display apparatus 2 calculated there from;

DETAILED DESCRIPTION OF THE INVENTION

Although the present invention is described with reference to the drawing figures in the following, those skilled in the art will appreciate that the scope of the invention is not limited to the specific forms shown in the figures. Various modifications, substitutions and enhancements may be made to the descriptions set forth herein, without departing from the spirit and scope of the invention which is set forth in the appended claims.

The following is a description of preferred embodiments for realizing the present invention.

First Embodiment

Figure 1:
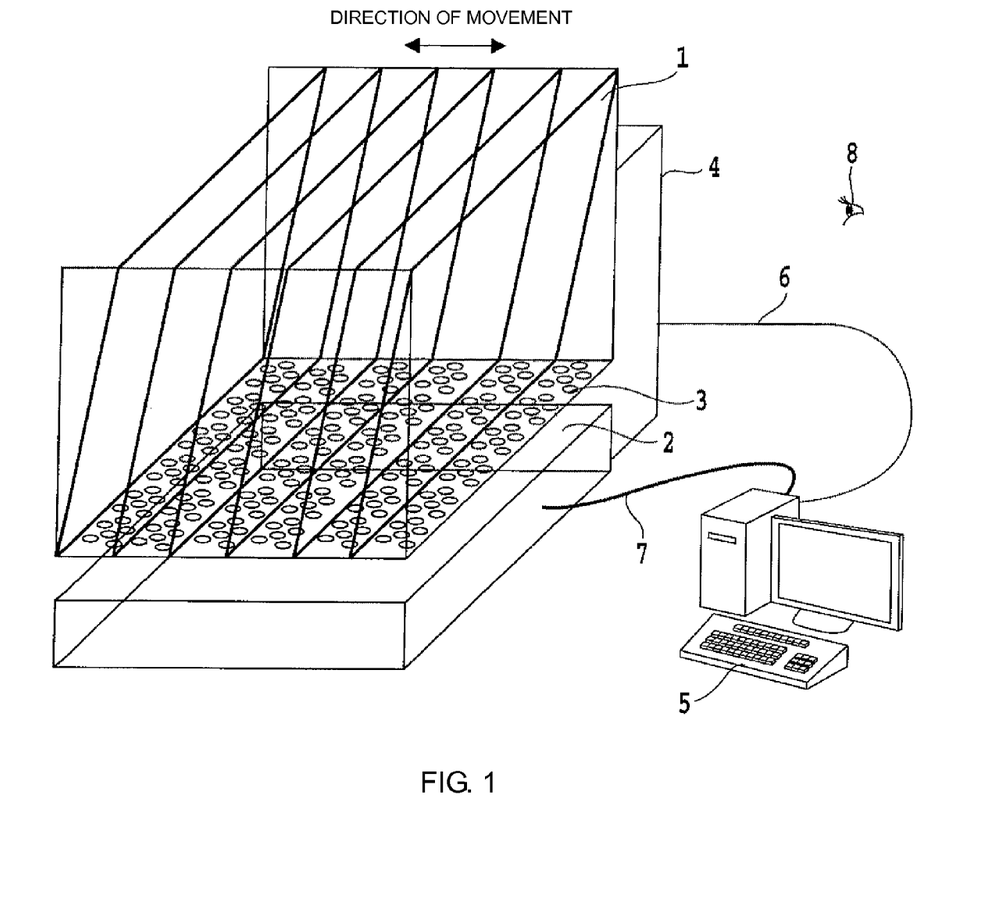
FIG. 1 shows the whole of a three-dimensional stereoscopic image display apparatus according to a first embodiment.

FIG. 1 shows the whole of a three-dimensional stereoscopic image display apparatus according to a first embodiment. Reference numeral 2 designates a flat display apparatus which is a display apparatus on which a two-dimensional image is displayed. The flat display apparatus 2 displays a two-dimensional image on a display screen in response to two-dimensional image data supplied from a computer system 5 via an output cable 7. Reference numeral 1 designates a stereoscopic diffusing panel which is a reflecting object having six films each comprising a planar surface arranged parallel to one another at equal intervals. The stereoscopic diffusing panel 1 is supported directly above the display screen of the flat display apparatus 2, i.e., in an optical path of image light from the display screen, by a driving apparatus 4, whose operation will be described later, such that each of the films is positioned obliquely relative to the display screen.

Each of the films of the stereoscopic diffusing panel 1 is a transparent mesh film comprising a planar surface on which glass beads have been sprayed or, alternatively, may be a semi-transparent film. Through a film having such a structure, light can be reflected (diffused) by the glass beads with higher reflection efficiency than with a white board and, moreover, light can also be transmitted. For each of the films, an upper edge side thereof is inclined forward from vertical toward a person 8 positioned in a direction square on to the planar surface of the film and, as will be described in detail later, a lower edge has fixed thereto a lens array 3 formed on a flat plate. The lens array 3 is close to the display screen of the flat display apparatus 2 and forms an image from the image light from the display screen on the surfaces of the inclined films. The driving apparatus 4 drives the stereoscopic diffusing panel 1 and the lens array 3 such that the stereoscopic diffusing panel 1 and the lens array 3 move to and fro in a horizontal direction, i.e., the depth direction from the side of a viewing person 8 schematically shown as eye 8, with the spacing between the lens array 3 and the display screen maintained constant. The driving apparatus 4 outputs a positive pulse to the computer system 5 via a position data signal line 6 when the stereoscopic diffusing panel 1 is at a starting point of the to-and-fro movement.

When an image is displayed on the display screen of the flat display apparatus 2, light from the displayed image is reflected at the surface of each of the films of the stereoscopic diffusing panel 1 and, hence, the person 8 viewing the stereoscopic diffusing panel 1 can see an image there. These reflecting portions are hereinafter referred to as the image display portions of the stereoscopic diffusing panel 1. When a stereoscopic image is displayed on the image display portions, a section of the stereoscopic image is thus displayed on the surface of each of the films.

Figure 2:
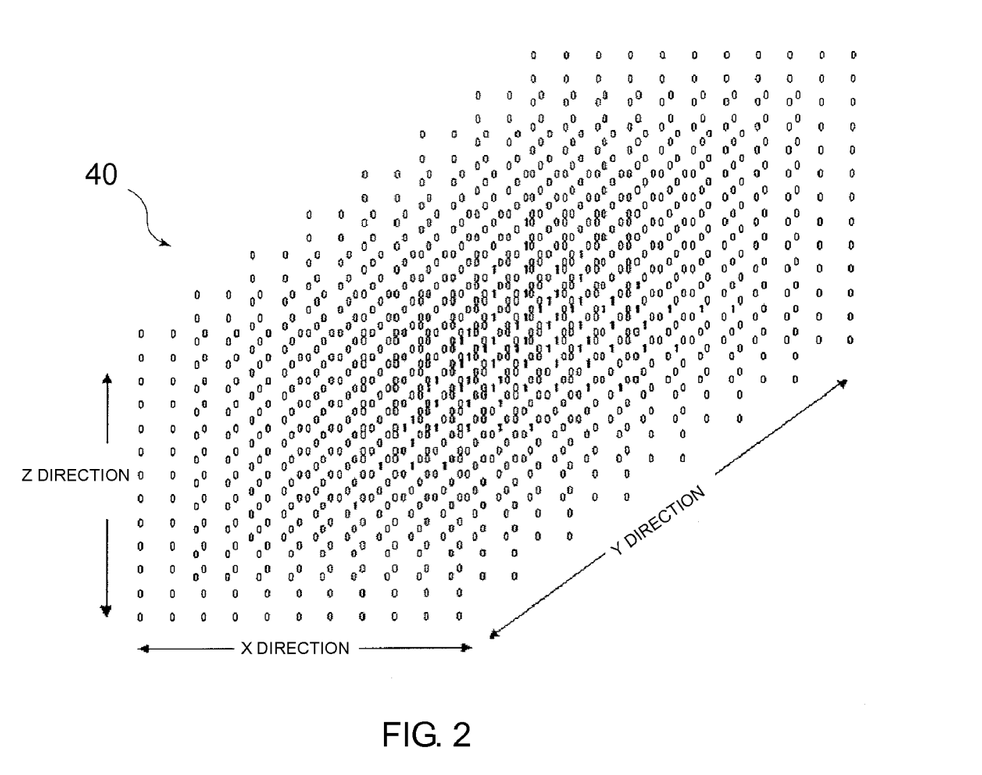
FIG. 2 schematically shows an example of memory contents of a display buffer for an image supplied to a two-dimensional display apparatus.

A stereoscopic image can be displayed on the image display portions of the stereoscopic diffusing panel 1 through the following procedure. First, a three-dimensional stereoscopic image created by the computer system 5 is loaded into an X, Y, Z buffer 40 as schematically shown in FIG. 2 in which X is transverse direction of the screen, Y is depth direction of the screen, and Z is height direction of the screen. The stereoscopic diffusing panel 1 receives data for sectional portions at positions in three-dimensional space from the buffer 40 and displays the received data. The actual display method is described below with reference to the drawings.

Figure 3:
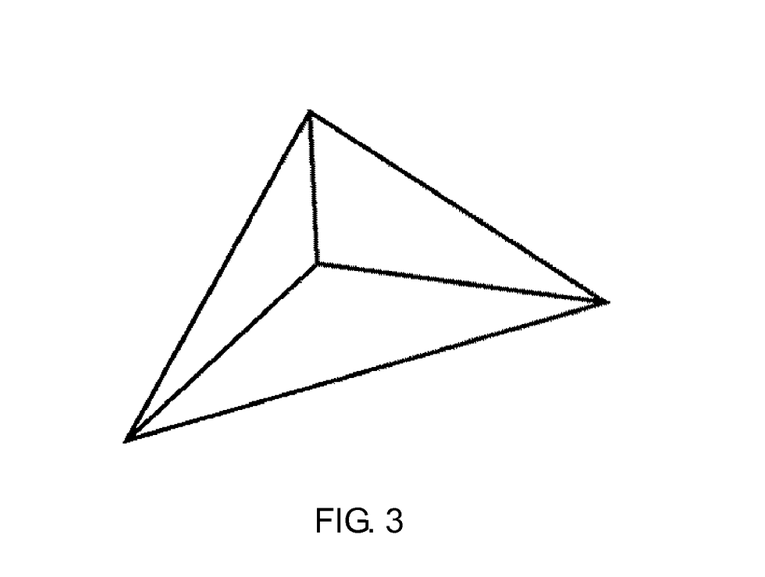
FIG. 3 shows an example of a three-dimensional figure to be displayed.
Figure 4A:
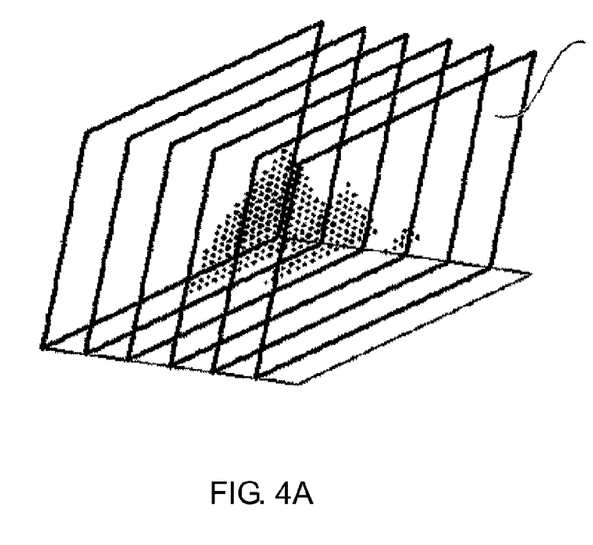
FIG. 4A shows the position of a stereoscopic diffusing panel 1 at a starting point and the positions of sections cut through the three-dimensional figure calculated for this time.
Figure 4B:
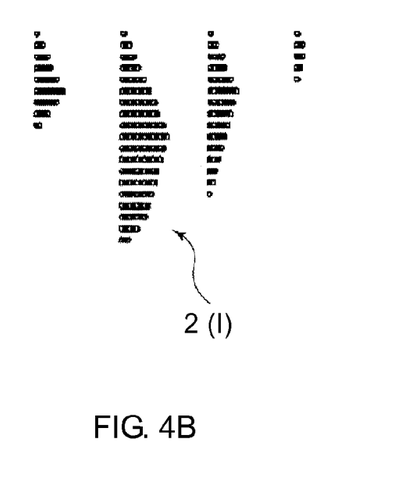
Figure 5A:
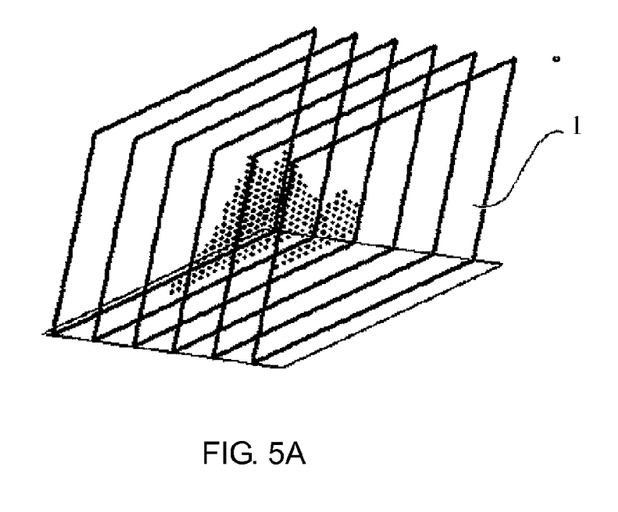
FIGS. 5A and 5B show sections for a time point when the stereoscopic diffusing panel 1 has been moved in the depth direction, and an image displayed on the flat display apparatus 2 calculated there from, respectively.
Figure 5B:
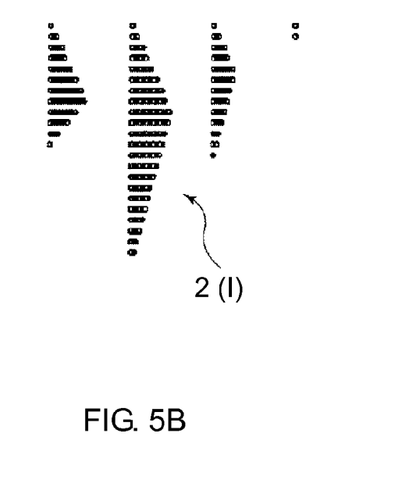
Figures 6A, 6B:
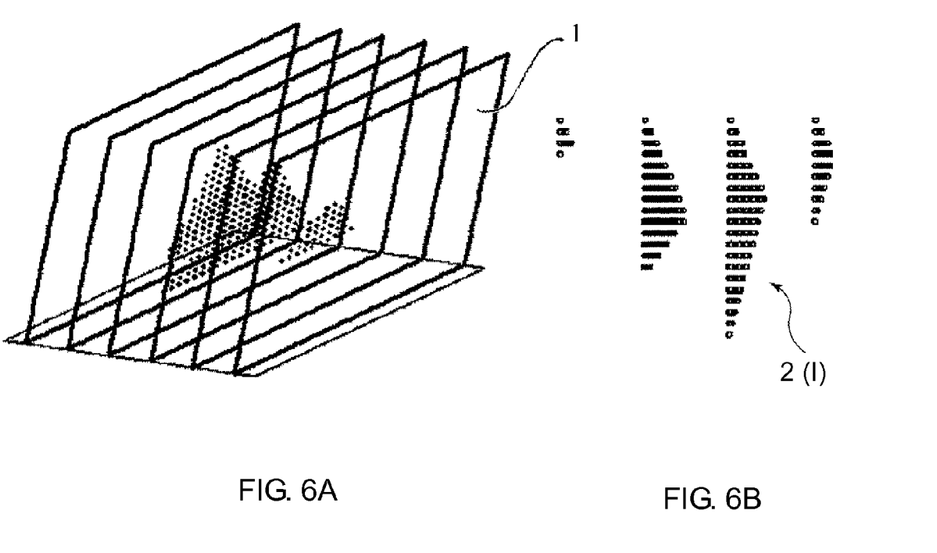
FIGS. 6A and 6B show sections for a time point when the stereoscopic diffusing panel 1 has been moved in the depth direction, and an image displayed on the flat display apparatus 2 calculated there from, respectively.
Figures 7A, 7B:
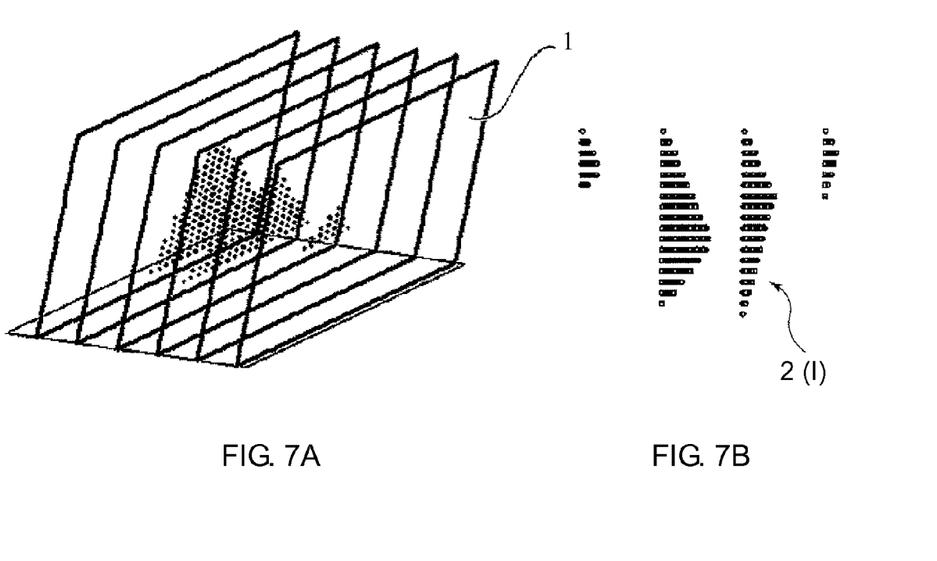
FIGS. 7A and 7B show sections for a time point when the stereoscopic diffusing panel 1 has been moved in the depth direction, and an image displayed on the flat display apparatus 2 calculated there from, respectively.

FIG. 3 shows a three-dimensional figure F to be displayed. FIG. 4A shows the position of the stereoscopic diffusing panel 1 at the starting point, and positions of sections cut through the three-dimensional figure calculated for this time. FIG. 4B shows an image 2(I) displayed on the two-dimensional flat display apparatus 2 calculated there from. FIGS. 5, 6, and 7 each show sections for a time point when the stereoscopic diffusing panel 1 has been moved in the depth direction and the image displayed on the flat display apparatus 2 calculated there from. The shape of the stereoscopic diffusing panel 1 is fixed to some extent and, hence, once the shapes of the sections have been created, extracting sections of the image described above from the X, Y, Z buffer 40 in which the image has been created can be carried out easily merely through adding to a pointer. In response to the movement of the stereoscopic diffusing panel 1, respective images are outputted to the flat display apparatus 2 in synchronization with the movement, whereby a three-dimensional stereoscopic image can be displayed in space.

Figure 8A:
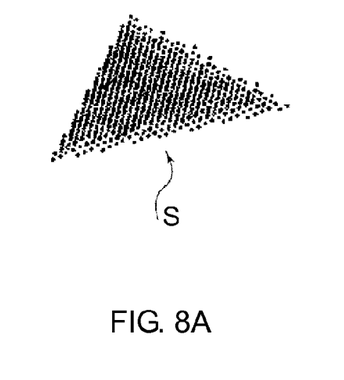
FIGS. 8A and 8B show a three-dimensional stereoscopic image and an image obtained by superimposing images projected by the two-dimensional flat display apparatus 2, displayed over a certain time interval, respectively.
Figure 8B:
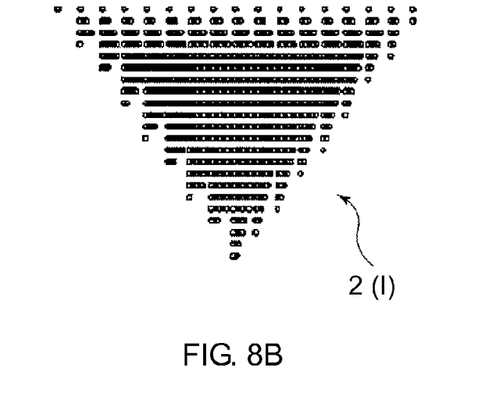

FIGS. 8A and 8B show a three-dimensional stereoscopic image (S) and an image 2(I) obtained by superimposing the images projected by the two-dimensional flat display apparatus 2, displayed over a certain time interval. By displaying the images for a sufficiently short time, the images remain as an after-image in the eyes of a person, and hence it looks just as if a three-dimensional body has been drawn in space.

Specifically, the stereoscopic diffusing panel 1 is oscillated in a 7.5 Hz sine wave. When the stereoscopic diffusing panel 1 reaches the starting point, in response to the outputted positive pulse signal, a two-dimensional image signal is outputted from the computer system 5 to the flat display apparatus 2 as a 60 Hz non-interlace signal, which is the standard for RGB output. Five screen's worth of the two-dimensional image signal are prepared, updating being carried out so as to become the next signal, for example, every 16.6 msec. Because the stereoscopic diffusing panel 1 is moved to and fro, five screens' worth of images corresponding to positions in the to-and-fro movement of the stereoscopic diffusing panel 1 are created. Taking the images to be A, B, C, D, and E, and the image corresponding to the starting point to be C, display is started from image C, and, then, when the stereoscopic diffusing panel 1 starts to be moved from the starting point, the images are outputted repeatedly in the image display order C→D→E→D→C→B→A→B→C.

In the present embodiment, this processing is all carried out using software on the computer system 5. Carrying out the processing using special hardware, such as a display adaptor, is more efficient since, then, it is possible to carry out the display without burdening the computer system 5.

While the three-dimensional stereoscopic image is being displayed, the displayed stereoscopic image can be made to move by rewriting the contents of the X, Y, Z buffer 40. Moreover, by arranging side-by-side a plurality of three-dimensional stereoscopic image display apparatuses each constituted as described above, the three-dimensional stereoscopic image can be displayed divided over the plurality of stereoscopic diffusing panels 1, and, hence, a larger stereoscopic image can be displayed over a larger space.

Figure 16:
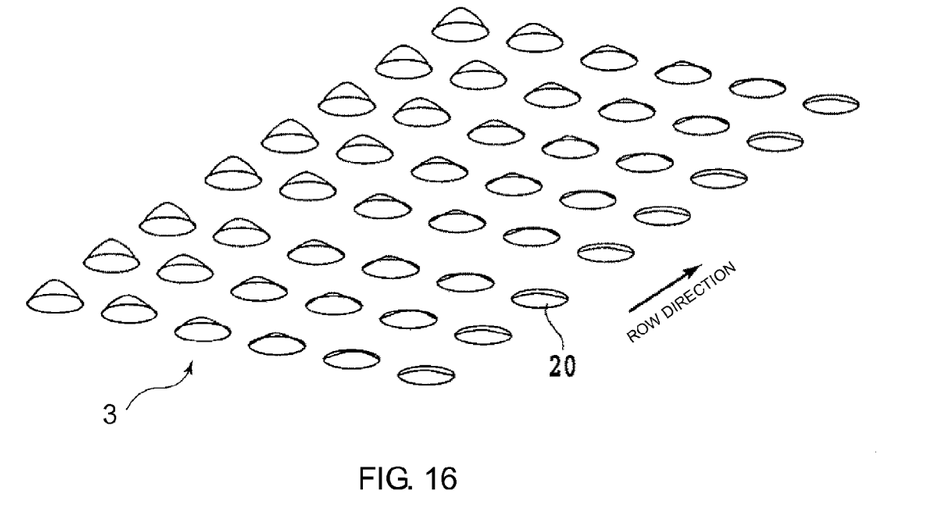
FIG. 16 shows the structure of a multifocal lens array.

FIG. 16 shows the lens array 3 used in the first embodiment. In the first embodiment, the constitution is such that the focal distance is the same in each row, and the focal distance gets successively longer from row to row. Moreover, the focal distances are made to be such that a surface containing all of the focal points hereinafter referred to as the "focal point-containing surface", is a planar surface. In actual practice, the lens array 3 is produced by forming lens shapes having the different focal distances in a mold made of Ni, and injection-molding a resin, e.g., ZEONOX (registered trademark)) into the mold. That is, the lens array 3 is formed on a flat plate. Moreover, each of lenses 20 is parallel to the surface of the flat plate and, hence, focuses to a focal point in a direction perpendicular to the surface of the flat plate. In the present embodiment, the focal distances of the lenses were selected to be in a range of 10 to 200 mm, the spacing between lens centers was made to be 50 μm (500 dpi), and the thickness at the maximum height was made to be 1.5 mm. The maximum height is preferably not more than 2 mm for rapid movement.

The lens array 3 is light-weight and thin, and, hence, the structure operated is simple so that there are no strength-related restrictions, and the load on other components is reduced.

Figure 17:
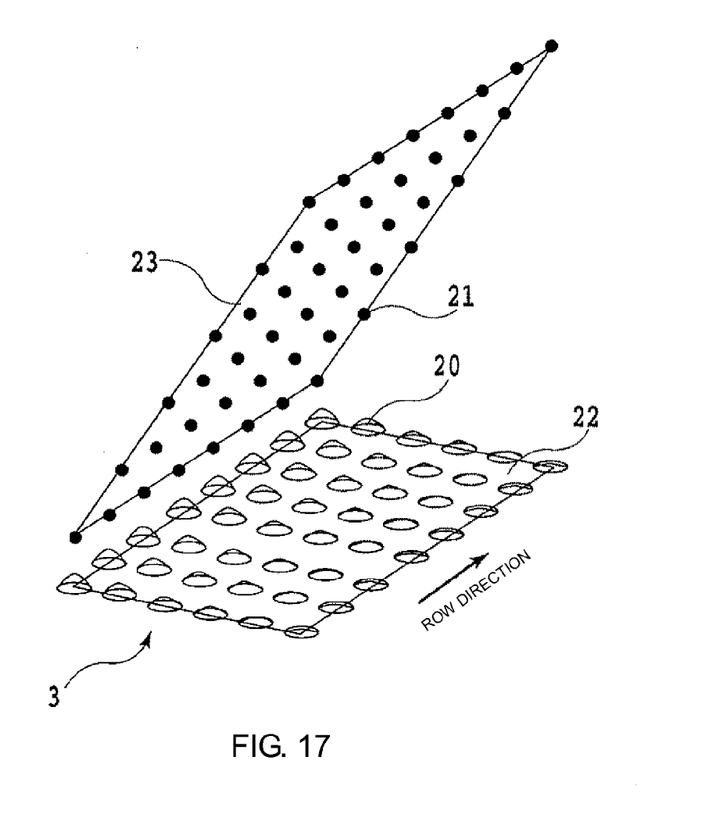
FIG. 17 shows a focal point-containing surface for the multifocal lens array of FIG. 16.

FIG. 17 shows the lens array 3 in the first embodiment and the planar surface on which the focal points are formed, i.e., the focal point-containing surface, which corresponds to the surfaces of the films of the stereoscopic diffusing panel 1. Lens 20 has a focal point 21. Lens array 3 has a surface 22, i.e., a planar surface 22, and focal point-containing surface 23. In the first embodiment, the focal point-containing surface 23 is a planar surface, and is inclined relative to the surface of the lens array 3.

Second Embodiment

Figure 9:
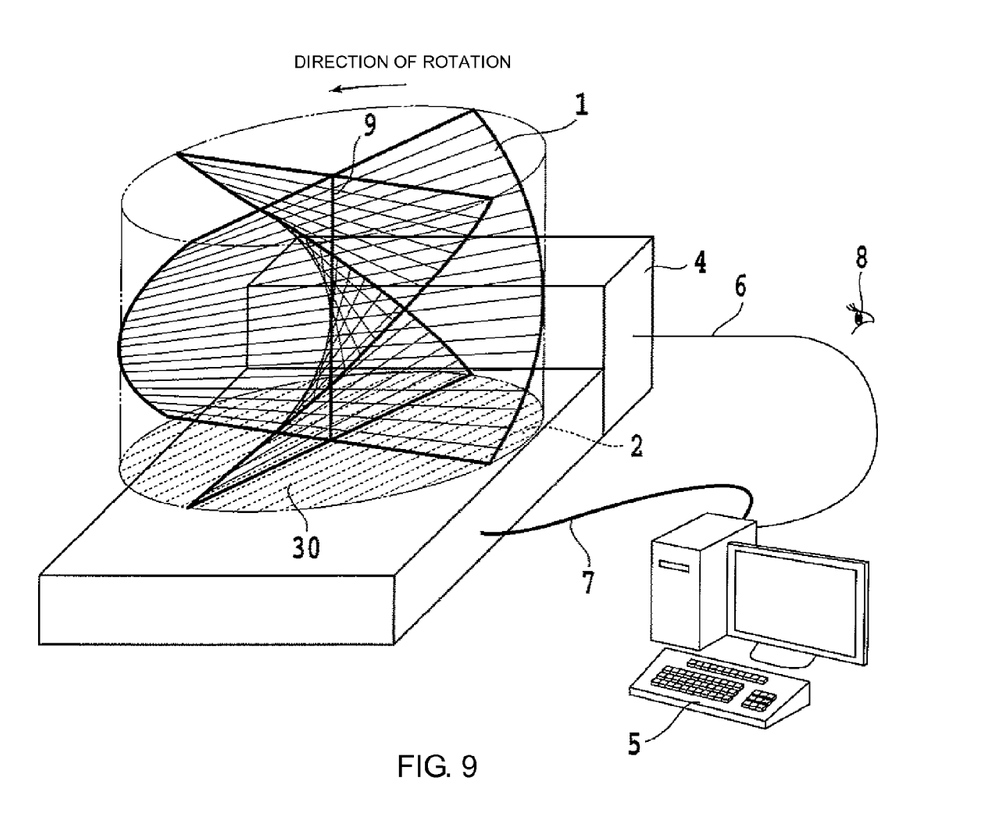
FIG. 9 shows the whole of a second embodiment.
Figure 10A:
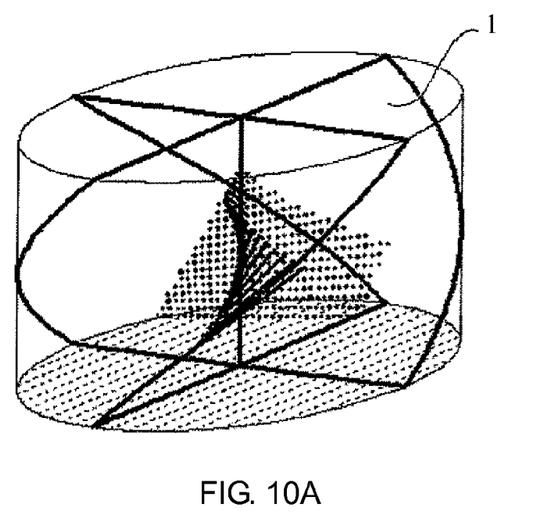
FIGS. 10A and 10B show a stereoscopic image displayed on the stereoscopic diffusing panel 1 at a certain time, and an image displayed on a display screen of the flat display apparatus 2, respectively.
Figure 10B:
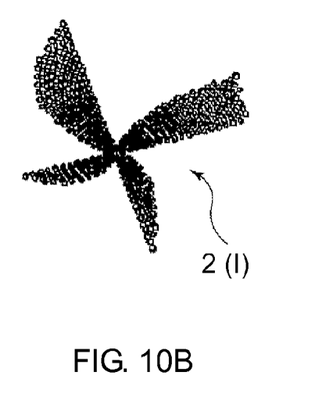
Figure 11A:
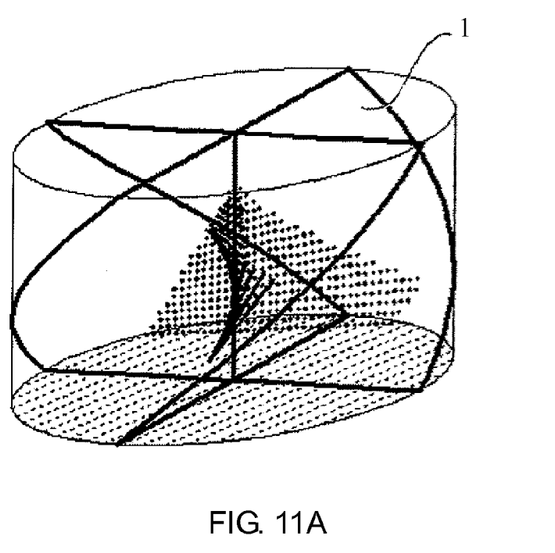
FIGS. 11A and 11B show a stereoscopic image displayed on the stereoscopic diffusing panel 1 at another certain time, and an image displayed on the display screen of the flat display apparatus 2, respectively.
Figure 11B:
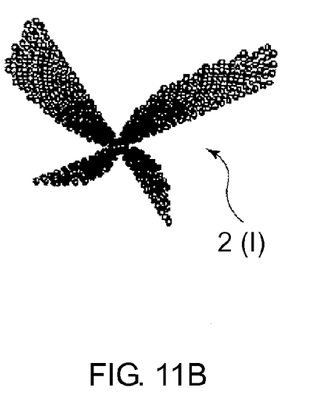
Figure 12A:
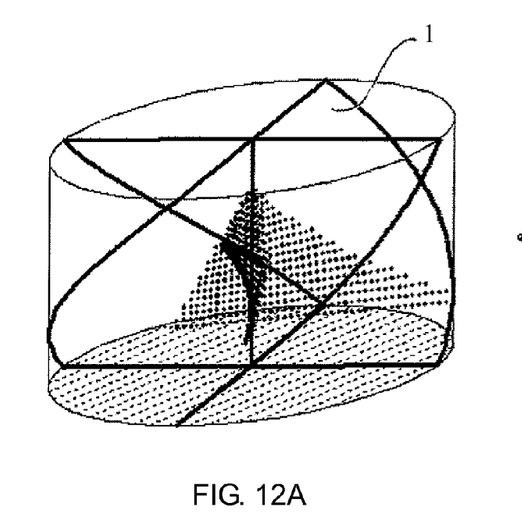
FIGS. 12A and 12B show a stereoscopic image displayed on the stereoscopic diffusing panel 1 at yet another certain time, and an image displayed on the display screen of the flat display apparatus 2, respectively.
Figure 12B:
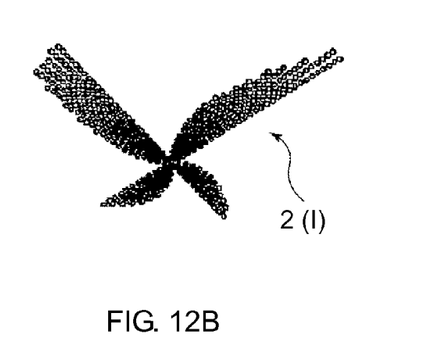
Figure 13A:
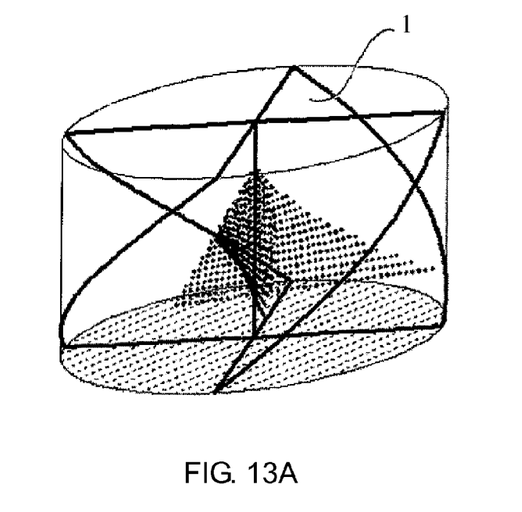
FIGS. 13A and 13B show a stereoscopic image displayed on the stereoscopic diffusing panel 1 at yet another certain time, and an image displayed on the display screen of the flat display apparatus 2, respectively.
Figure 13B:
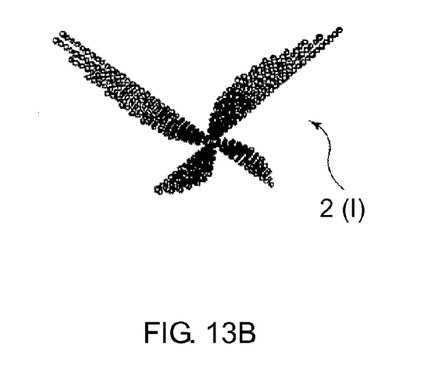

FIG. 9 shows the whole of a second embodiment. As shown in FIG. 9, in the present embodiment, the structure of the stereoscopic diffusing panel is different from that of the first embodiment, the method of driving the stereoscopic diffusing panel is also different from that of the first embodiment and, furthermore, the image data supplied to the flat display apparatus 2 is different from that in the first embodiment.

For the driving apparatus 4, a rotating shaft 9 is disposed via a suitable arm (not shown) perpendicular to the display screen of the flat display apparatus 2 directly above the flat display apparatus 2. Four panels (curved plates) 1a, 1b, 1c, and 1d constituting the stereoscopic diffusing panel are fixed to the rotating shaft 9, and are rotated about the rotating shaft 9. The four panels 1a, 1b, 1c, and 1d are fixed to the rotating shaft 9 every 90°. For each of the four panels 1a, 1b, 1c, and 1d, each of a lower edge and an upper edge is a straight line, and the panel is curved between the upper edge and the lower edge such that the upper edge is positioned 90° ahead of the lower edge in the direction of rotation. The shape is such that an outer edge between the upper and lower edges contacts the same cylinder for all of the four panels 1a, 1b, 1c, and 1d. Each of the four panels 1a, 1b, 1c, and 1d comprises a transparent plastic plate having a surface thereof coated with a fluorescent material. A lens array 30 formed on a flat plate is fixed to the lower edge of each of the four panels 1a, 1b, 1c, and 1d, and rotates together with the four panels 1a, 1b, 1c, and 1d. The four panels 1a, 1b, 1c, and 1d are rotated so as to maintain a constant spacing from the display screen of the flat display apparatus 2.

Figure 18:
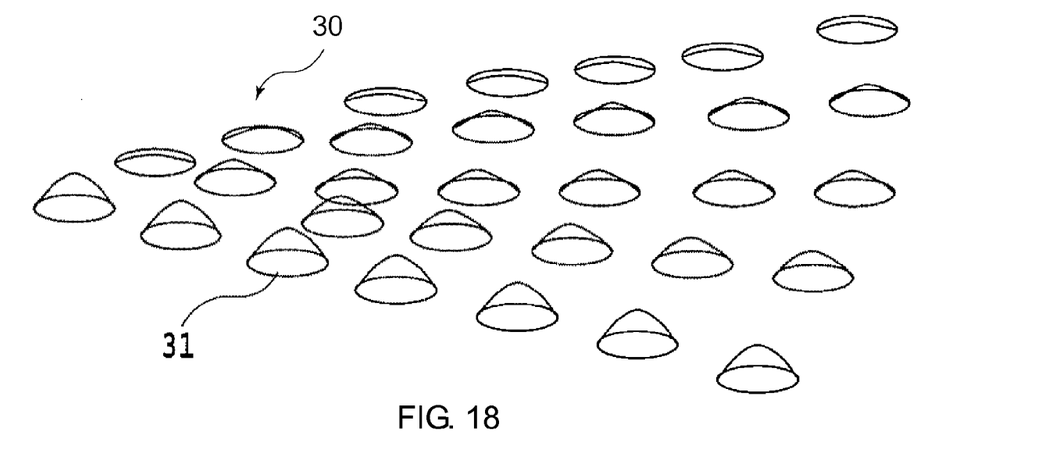
FIG. 18 shows the structure of another multifocal lens array.

FIG. 18 shows the lens array 30 used in the second embodiment. As will be described in detail below, in the second embodiment, the lens array 30 is produced so that a plurality of lenses are arranged in a fan shape, the lenses having focal distances such that the focal points are formed on a curved surface, i.e., a focal point-containing surface which is on each panel 1a, 1b, 1c, or 1d, and are represented in terms of polar coordinates by:

$$X = r \times \cos \Theta$$

$$Y = r \times \sin \Theta$$

$$Z = a \times \Theta$$

where X, Y, Z are three-dimensional rectangular coordinate system coordinate axes, r is radius, Θ is angle, and a is a constant. In actual practice, the lens array 30 is produced by forming lens shapes having the different focal distances in a mold made of Ni, and injection-molding a resin, e.g., ZEONOX (registered trademark)) into the mold. That is, the lens array 30 is formed on a flat plate. Moreover, each of the lenses is parallel to the surface of the flat plate and, hence, focuses to a focal point in a direction perpendicular to the surface of the flat plate.

Figure 19:
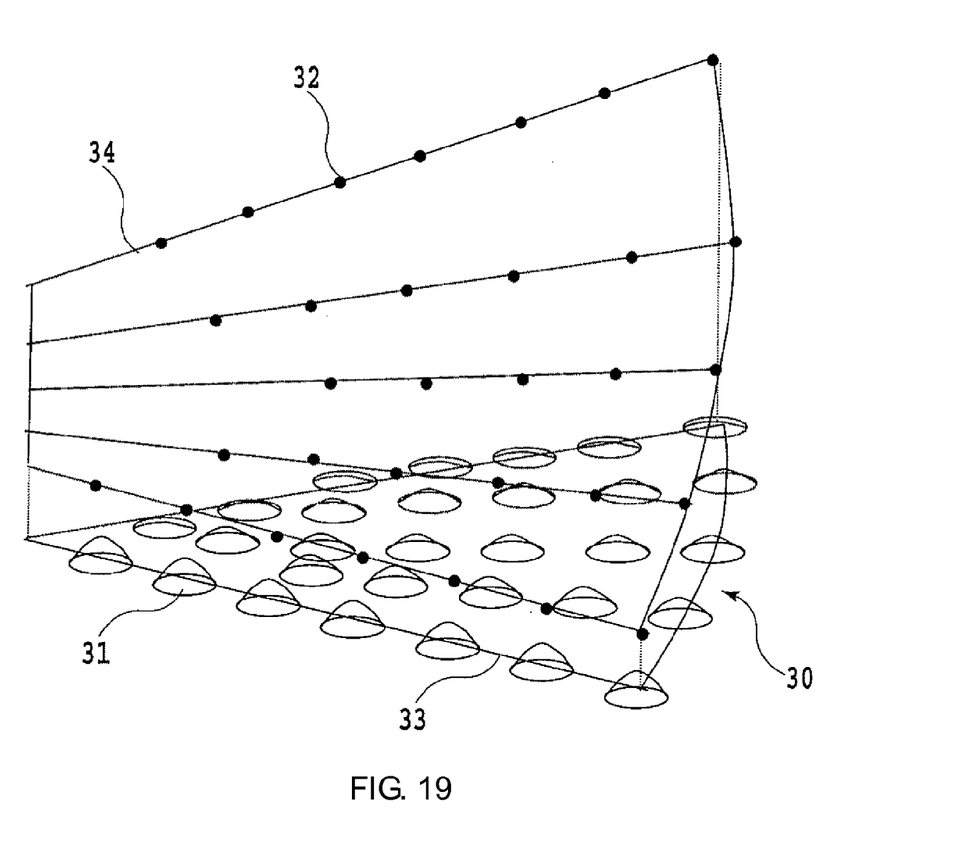
FIG. 19 shows a focal point-containing surface for the other multifocal lens array of FIG. 18.

FIG. 19 shows the lens array 30 in the second embodiment and the curved surface on which the focal points are formed, i.e., the focal point-containing surface. Lens 31 has focal point 32. Lens array 30 has surface 33, which is a planar surface, and focal point-containing surface 34.

In the present embodiment, an ordinary liquid crystal display apparatus was used as the flat display apparatus 2. The speed of rotation of the stereoscopic diffusing panel was made to be 900 rpm (15 Hz).

In the present embodiment, because the stereoscopic diffusing panel is constituted from the four panels 1a, 1b, 1c, and 1d, at any given point the image can be updated 60 times per second. Referring to the four divided panels as the first panel, the second panel, the third panel, and the fourth panel, respectively, the stereoscopic diffusing panel is rotated, and, after display on the first panel of the image light from the display screen of the flat display apparatus 2, when the second panel reaches the same place, the displayed image from the flat display apparatus 2 is updated, and so on thereafter, whereby for the person 8 viewing the stereoscopic diffusing panel it looks just as if the displayed stereoscopic image has moved due to an after-image effect.

For the synchronization of the rotation of the stereoscopic diffusing panel and the images displayed by the flat display apparatus 2, the rotating shaft 9 of the stereoscopic diffusing panel is provided with a rotation encoder, and a rotation detecting pulse from the rotation encoder is supplied to the computer system 5 via the position data signal line 6. The computer system 5 updates the signal outputted to the flat display apparatus 2 in response to the rotation detecting pulse signal.

The stereoscopic image displayed by the stereoscopic diffusing panel 1 is created by the computer system 5 as in the first embodiment. When the stereoscopic image is decomposed into sections, processing is carried out as follows. The stereoscopic image is specified in terms of X, Y, and Z coordinates, and hence these coordinates are converted into r, Θ, and z polar coordinates for the whole of space where r is radius and Θ is angle. Here, a ring buffer 50 structure is used for the Z direction for each r, Θ point. Next, for the shape of a section extracted by the stereoscopic diffusing panel 1, a pointer indicating the Z position for each r and Θ is set, and the data indicated by the pointer is collected together so as to create one sectional image. When the stereoscopic diffusing panel 1 is rotated, the change in the angle is proportional to the change in the height because the height for the section is represented by Z=a×Θ. The sectional image obtained by sectioning the stereoscopic image can thus be swiftly displayed by the stereoscopic diffusing panel 1 by changing the Z direction pointer by one each time the angle advances. The stereoscopic images displayed on the stereoscopic diffusing panel 1, and images 2(I) displayed on the display screen of the flat display apparatus 2 are shown in FIGS. 10 to 13. As in the first embodiment, a three-dimensional stereoscopic image can be displayed in space.

The above processing is all carried out using software on the computer system 5. The calculation is simple, hence, even more rapid processing is possible if the processing is carried out using hardware such as an LSI. Moreover, the stereoscopic diffusing panel 1 can alternatively be driven with a combination of rotation and to-and-fro movement in the depth direction.

Third Embodiment

Figure 14:
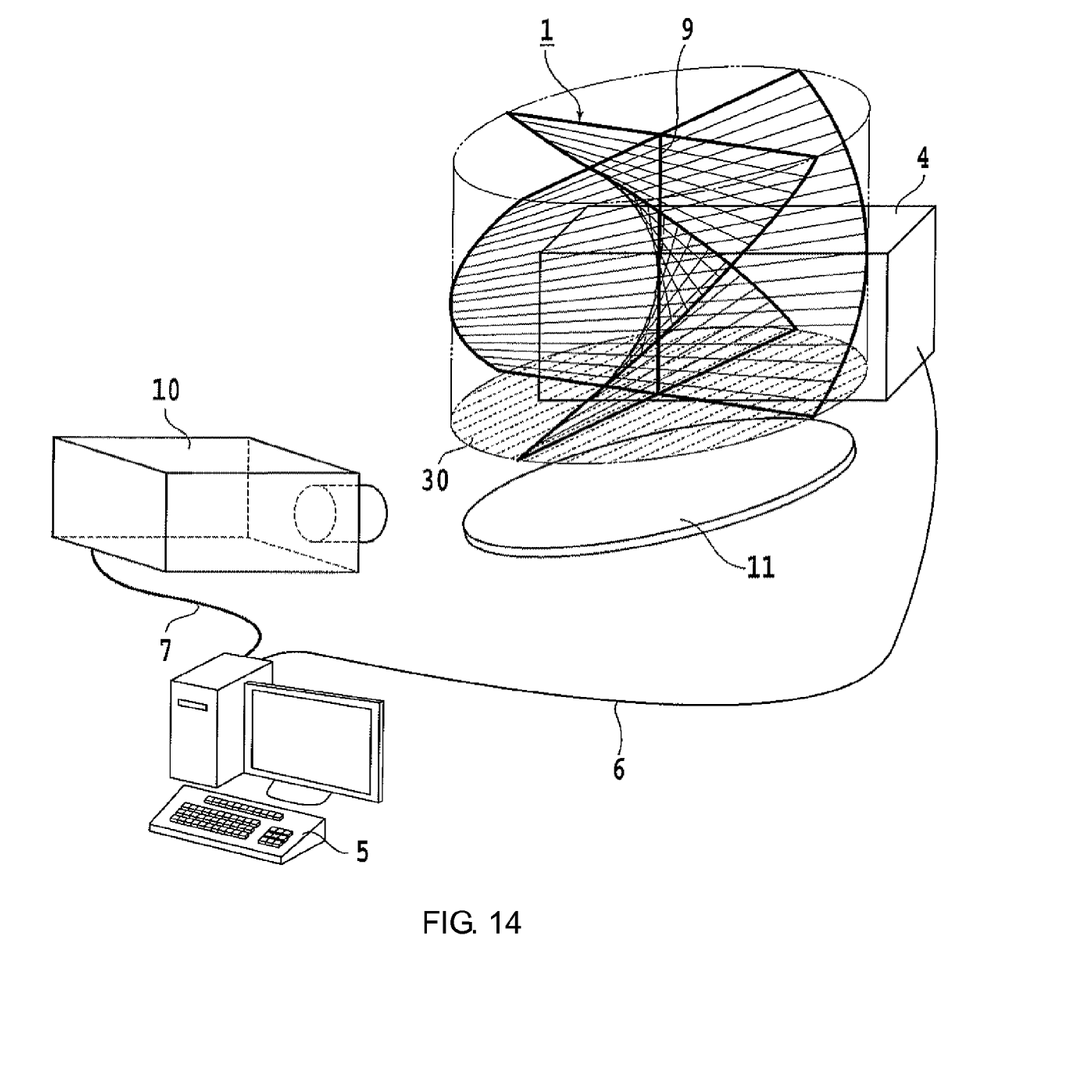
FIG. 14 shows the whole of a third embodiment.

In the present embodiment, the whole of which is shown in FIG. 14, the constitution is as in the second embodiment except that a liquid crystal projector 10 is used as the display apparatus. The liquid crystal projector 10 uses an optical system for enlarged display and, hence, a mirror 11 is provided which converts projected light from the liquid crystal projector 10 into parallel light and projects the parallel light onto the stereoscopic diffusing panel 1 via the lens array 30. Other than this optical system, the processing can be carried out as in the second embodiment. Note that the liquid crystal projector 10 and the mirror 11 can be designed so as to have a constitution specially for the present invention thus avoiding waste.

Fourth Embodiment

Figure 15:
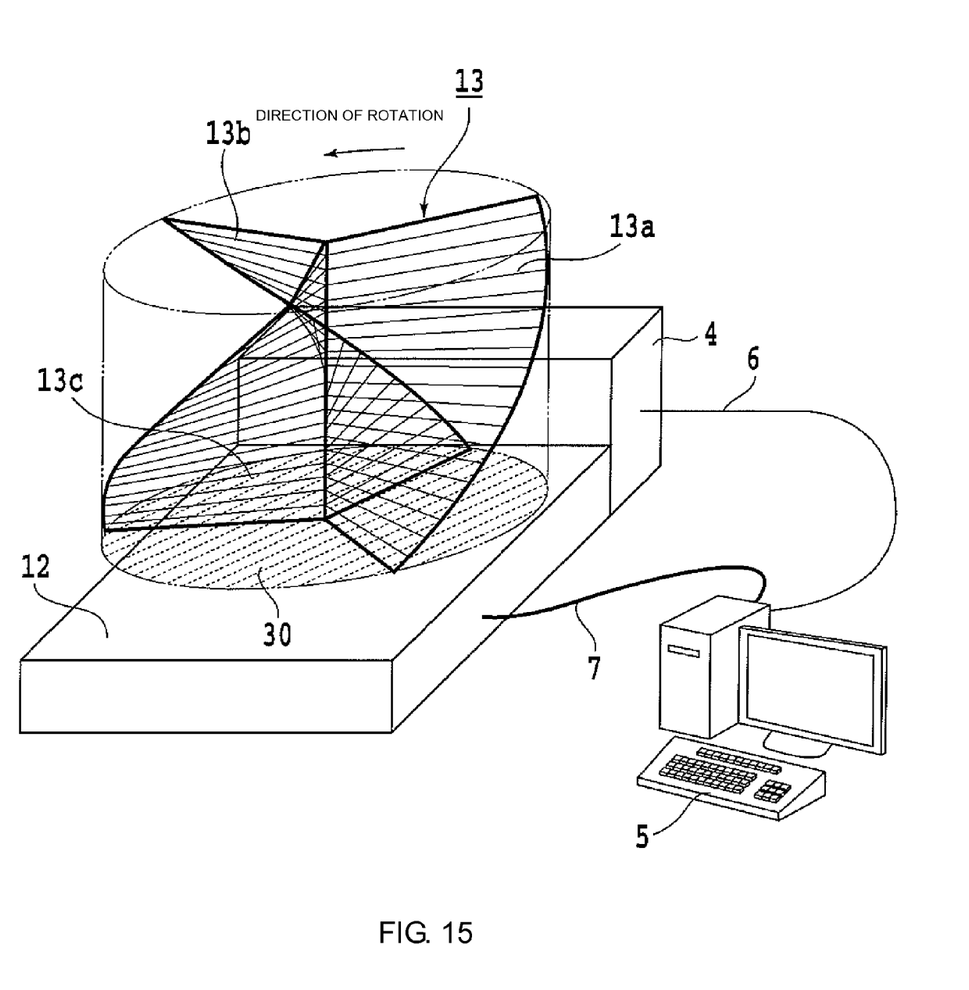
FIG. 15 shows the whole of a fourth embodiment.

As shown in FIG. 15, an EL display apparatus 12 is used as the display apparatus. As a stereoscopic diffusing panel 13, three panels 13a, 13b, and 13c are fixed to the rotating shaft 9 every 120°. The lens array 30 is then fixed to a lower edge of each of the panels. The method of constituting (designing) the panels and the lens array 30 is the same as in the second embodiment.

The EL display apparatus 12 displays a monochromatic image. For each of the panels, each of the lower edge and an upper edge is a straight line, and the panel is curved between the upper edge and the lower edge such that the upper edge is positioned 120° ahead of the lower edge in the direction of rotation. The shape is such that an outer edge between the upper and lower edges contacts the same cylinder for all of the three panels 13a, 13b, and 13c. Each of the three panels 13a, 13b, and 13c comprises a curved plate having, respectively, a blue, red, or green color-converting material embedded therein. Upon a monochromatic image being emitted from the EL display apparatus 12, the three panels 13a, 13b, and 13c reflect, blue, red, and green light, i.e., light of three primary colors, respectively.

Image processing can be carried out as in the second embodiment. In the present embodiment, monochromatic light is emitted, and blue, red, and green light, i.e., light of the three primary colors, is reflected, whereby a desired color image can be composed and seen in space due to an after-image effect.

While the present invention has been described in conjunction with embodiments and variations thereof, one of ordinary skill after reviewing the foregoing specification will be able to effect various changes, substitutions of equivalents and other alterations without departing from the broad concepts disclosed herein. It is therefore intended that Letters Patent granted hereon be limited only by the definition contained in the appended claims and equivalents thereof.

What is claimed is:

1. A multifocal lens array, comprising:
a planar surface;
a plurality of lenses arranged on said planar surface and having respective focal distances; and
a stereoscopic diffusing surface inclined relative to said planar surface,
wherein said respective focal distances of said plurality of lenses are selected so that a focal point-containing surface is formed at said surface inclined relative to said planar surface wherein said focal point-containing surface is a curved surface, wherein said curved surface has a shape including part of a curved surface represented by $X=r_x \cos \theta$, $Y=r_x \sin \theta$, $Z=a_x \theta$ in terms of polar coordinates, where X, Y and Z are three-dimensional rectangular coordinate system coordinate axes, r is a radius, θ is an angle, and a is a constant.

2. The multifocal lens array according to claim 1, wherein each lens of said plurality of lenses has a thickness of not more than 2 mm.

3. The multifocal lens array according to claim 1, wherein the stereoscopic diffusing surface is provided by a stereoscopic diffusing panel that comprises a plurality of films each comprising a planar surface arranged parallel to one another at equal intervals so that each of the films is positioned obliquely relative to the planar surface, and that is movably supported directly above the planar surface in an optical path from the planar surface.

4. The multifocal lens array according to claim 1, wherein the plurality of lenses is a plurality of discrete lenses arranged on said planar surface in an array and each having a lens shape.

5. A three-dimensional stereoscopic image display apparatus, comprising:
a display apparatus which displays a two-dimensional image;
a multifocal lens array which comprises:
a planar surface;
a plurality of lenses arranged on said planar surface and having respective focal distances; and
a stereoscopic diffusing surface inclined relative to said planar surface,
wherein said respective focal distances of said plurality of lenses are selected so that a focal point-containing surface is formed at said surface inclined relative to said planar surface,
and which is disposed in a position at which light is incident from a display screen of said display apparatus;
a transparent or semi-transparent reflecting object having a surface which is positioned at said focal point-containing surface and which reflects light from the display screen of said display apparatus which has been formed into an image via said multifocal lens array;
driving means for driving said reflecting object and said multifocal lens array such that said reflecting object and said multifocal lens array move periodically while maintaining a spacing between the display screen of said display apparatus and said multifocal lens array; and
image data producing means for producing data for two-dimensional images displayed by said display apparatus such that a sectional image of a three-dimensional stereoscopic image is rendered on said surface of said reflecting object by light from the two-dimensional image displayed on the display screen of said display apparatus, and in synchronization with the movement of said reflecting object and said multifocal lens array, sectional images of said three-dimensional stereoscopic image at positions corresponding to the movement are rendered on said surface of said reflecting object.

6. The three-dimensional stereoscopic image display apparatus according to claim 5, wherein said reflecting object has a plurality of reflecting surfaces.

7. The three-dimensional stereoscopic image display apparatus according to claim 5, wherein the periodic movement has a frequency of not less than 5 Hz.

8. The three-dimensional stereoscopic image display apparatus according to claim 5, wherein said driving means carries out the driving such that said reflecting object and said multifocal lens array undergo periodic parallel movement in an optical path of the light from the display screen of said display apparatus.

9. The three-dimensional stereoscopic image display apparatus according to claim 5, wherein said display apparatus is a flat display apparatus.

10. The three-dimensional stereoscopic image display apparatus according to claim 5, wherein said display apparatus employs image projection and is a projection-type display apparatus.

11. The three-dimensional stereoscopic image display apparatus according to claim 5, wherein said image data producing means produces the two-dimensional image data in synchronization with a signal relating to the driving of said reflecting object from said driving means.

12. The three-dimensional stereoscopic image display apparatus according to claim 5, wherein said display apparatus displays a monochromatic two-dimensional image, said reflecting object has a plurality of reflecting surfaces, and materials that convert and reflect different colors are used respectively on said reflecting surfaces of said reflecting object, whereby a color stereoscopic image is composed.

13. A three-dimensional stereoscopic image display apparatus, comprising:
 a plurality of three-dimensional stereoscopic image display apparatuses according to claim 5 arranged side-by-side,
 whereby the plurality of three-dimensional stereoscopic image display apparatuses display a three-dimensional stereoscopic image which is divided over the plurality of said reflecting objects.

14. The three-dimensional stereoscopic image display apparatus according to claim 5, wherein the stereoscopic diffusing surface is provided by a stereoscopic diffusing panel that comprises a plurality of films each comprising a planar surface arranged parallel to one another at equal intervals so that each of the films is positioned obliquely relative to the planar surface, and that is movably supported directly above the planar surface in an optical path from the planar surface.

15. The three-dimensional stereoscopic image display apparatus according to claim 5, wherein the plurality of lenses is a plurality of discrete lenses arranged on said planar surface in an array and having a lens shape.

16. A three-dimensional stereoscopic image display apparatus, comprising:
 a display apparatus which displays a two-dimensional image;
 a multifocal lens array, which comprises
  a planar surface,
  a plurality of lenses arranged on said planar surface and having respective focal distances, and
  a surface inclined relative to said planar surface,
  wherein said respective focal distances of said plurality of lenses are selected so that a focal point-containing surface is formed at said surface inclined relative to said planar surface,
 and which is disposed in a position at which light is incident from a display screen of said display apparatus;
 a transparent or semi-transparent reflecting object having a surface which is positioned at said focal point-containing surface and which reflects light from the display screen of said display apparatus which has been formed into an image via said multifocal lens array;
 driving means for driving said reflecting object and said multifocal lens array such that said reflecting object and said multifocal lens array move periodically while maintaining a spacing between the display screen of said display apparatus and said multifocal lens array, wherein said driving means carries out the driving such that said reflecting object and said multifocal lens array rotate periodically in an optical path of the light from the display screen of said display apparatus; and
 image data producing means for producing data for two-dimensional images displayed by said display apparatus such that a sectional image of a three-dimensional stereoscopic image is rendered on said surface of said reflecting object by light from the two-dimensional image displayed on the display screen of said display apparatus, and in synchronization with the movement of said reflecting object and said multifocal lens array, sectional images of said three-dimensional stereoscopic image at positions corresponding to the movement are rendered on said surface of said reflecting object.

17. A three-dimensional stereoscopic image display apparatus, comprising:
 a display apparatus which displays a two-dimensional image;
 a multifocal lens array which comprises
  a planar surface,
  a plurality of lenses arranged on said planar surface and having respective focal distances, and
  a surface inclined relative to said planar surface,
  wherein said respective focal distances of said plurality of lenses are selected so that a focal point-containing surface is formed at said surface inclined relative to said planar surface,
 and which is disposed in a position at which light is incident from a display screen of said display apparatus;
 a transparent or semi-transparent reflecting object having a surface which is positioned at said focal point-containing surface and which reflects light from the display screen of said display apparatus which has been formed into an image via said multifocal lens array, wherein said reflecting object has (a) glass beads or (b) fluorescent paint attached to said surface;
 driving means for driving said reflecting object and said multifocal lens array such that said reflecting object and said multifocal lens array move periodically while maintaining a spacing between the display screen of said display apparatus and said multifocal lens array; and
 image data producing means for producing data for two-dimensional images displayed by said display apparatus such that a sectional image of a three-dimensional stereoscopic image is rendered on said surface of said reflecting object by light from the two-dimensional image displayed on the display screen of said display apparatus and in synchronization with the movement of said reflecting object and said multifocal lens array sectional images of said three-dimensional stereoscopic image at positions corresponding to the movement are rendered on said surface of said reflecting object.

* * * * *